United States Patent
Choi et al.

(10) Patent No.: US 8,980,090 B2
(45) Date of Patent: Mar. 17, 2015

(54) APPARATUS AND METHOD FOR ALTERNATIVE AERATION-EFFLUENT WASTEWATER TREATMENT USING CERAMIC MEMBRANE

(75) Inventors: Yong Su Choi, Seoul (KR); Seok Won Hong, Seoul (KR); Jae Shik Chung, Seoul (KR); Yong Bae Park, Seoul (KR); Gyo Bum Kim, Seoul (KR); Yun Chul Chung, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 440 days.

(21) Appl. No.: 13/545,105

(22) Filed: Jul. 10, 2012

(65) Prior Publication Data

US 2013/0015124 A1    Jan. 17, 2013

(30) Foreign Application Priority Data

Jul. 15, 2011   (KR) .................. 10-2011-0070465

(51) Int. Cl.
  C02F 3/30      (2006.01)
  C02F 3/20      (2006.01)
  C02F 103/34    (2006.01)
(52) U.S. Cl.
  CPC .............. C02F 3/308 (2013.01); C02F 3/201 (2013.01); C02F 2103/343 (2013.01); Y10S 210/903 (2013.01); Y10S 210/906 (2013.01)
  USPC ........... 210/605; 210/614; 210/623; 210/903; 210/906
(58) Field of Classification Search
  CPC ..... C02F 3/308; C02F 3/201; C02F 2103/343
  USPC .......... 210/605, 614, 620, 621, 623, 903, 906
  See application file for complete search history.

(56) References Cited

U.S. PATENT DOCUMENTS

| 2001/0045391 | A1* | 11/2001 | Han ........................... 210/605 |
| 2003/0042199 | A1* | 3/2003 | Smith ........................ 210/605 |
| 2007/0235386 | A1* | 10/2007 | Barnes ...................... 210/605 |

FOREIGN PATENT DOCUMENTS

| JP | 57-110397 A | * 7/1982 |
| JP | 10-309595 | 11/1998 |

(Continued)

OTHER PUBLICATIONS

Kwang Ho Lee, et al. "Removal Efficiencies and Nitrogen Mass Balance According to SRT in Intermittently-aerated Membrane Bioreactor (IAMBR)", Korean Society of Civil Engineers, 2004, pp. 2626-2630 (6 pages, including English language Introduction).

(Continued)

*Primary Examiner* — Fred Prince
(74) *Attorney, Agent, or Firm* — NSIP Law

(57) ABSTRACT

Disclosed are apparatus and method for alternative aeration-effluent wastewater treatment using a ceramic membrane, which allows the biological treatment to be performed sufficiently in an intermittent aeration tank by combining an anaerobic tank with a plurality of intermittent aeration tanks and selectively changing an inflow path of influent water according to an operation status of the intermittent aeration tanks. The present disclosure is directed to providing an apparatus and method for alternative aeration-effluent wastewater treatment, which allows the aeration and treated water to continuously discharge through two intermittent aeration tanks by independently forming an air injection line and a treated water discharge line at a ceramic membrane provided in each intermittent aeration tank.

9 Claims, 1 Drawing Sheet

(56) References Cited

FOREIGN PATENT DOCUMENTS

| | | |
|---|---|---|
| JP | 2000-288575 | 10/2000 |
| JP | 2001-276874 | 10/2001 |
| KR | 10-0275563 B1 | 12/2000 |
| KR | 10-2003-0042133 A | 5/2003 |
| KR | 10-2004-0075413 A | 8/2004 |
| KR | 10-2005-0099123 A | 10/2005 |
| KR | 10-0628908 B1 | 9/2006 |
| KR | 10-0876683 B1 | 1/2009 |
| KR | 10-2010-0089637 A | 8/2010 |
| KR | 10-2010-0098159 A | 9/2010 |
| KR | 10-0992463 B1 | 11/2010 |
| KR | 10-1006735 B1 | 1/2011 |
| KR | 10-1036001 B1 | 5/2011 |

OTHER PUBLICATIONS

Yuri Lee, et al. "Decolorization of Dye Solution Using Membrane Bioreactor (MBR) by Trametes Versicolor", Clean Technology, Autumn 2004, vol. 10, No. 3, pp. 131-137 (7 pages, including English language Abstract).

* cited by examiner

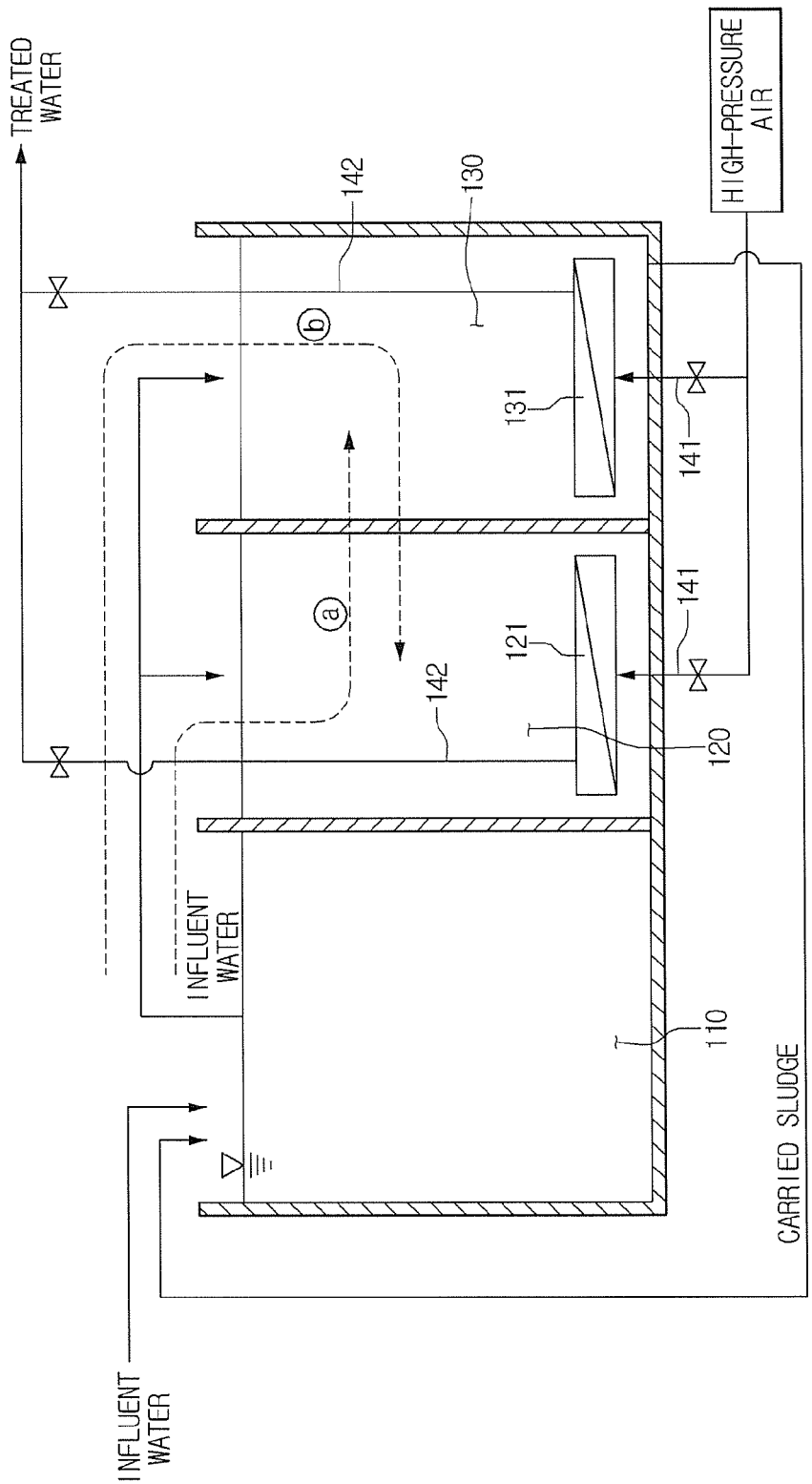

APPARATUS AND METHOD FOR ALTERNATIVE AERATION-EFFLUENT WASTEWATER TREATMENT USING CERAMIC MEMBRANE

CROSS-REFERENCE TO RELATED APPLICATION

This application claims priority to Korean Patent Application No. 10-2011-0070465, filed on Jul. 15, 2011, and all the benefits accruing therefrom under 35 U.S.C. §119, the contents of which in its entirety are herein incorporated by reference.

BACKGROUND

1. Field

The present disclosure relates to an apparatus and method for alternative aeration-effluent wastewater treatment using a ceramic membrane, and more particularly, to an apparatus and method for alternative aeration-effluent wastewater treatment using a ceramic membrane, which allows the biological treatment to be performed sufficiently in an intermittent aeration tank by combining an anaerobic tank with a plurality of intermittent aeration tanks and selectively changing an inflow path of influent water according to an operation status of the intermittent aeration tanks and allows the aeration and treated water to continuously discharge through two intermittent aeration tanks by independently forming an air injection line and a treated water discharge line at a ceramic membrane provided in each intermittent aeration tank.

2. Description of the Related Art

At this point in time where environmental problems are discussed as global issues, the desire for high-quality and safe water and agreeable hydrological environments is increasing day by day. Even though an existing sewage function was subjected only to removing organic substances, the sewage function has been improved by applying an advance treatment technique including removal of nitrogen and phosphorus. In addition, it is expected that the importance on the advancement of sewage function will continuously increase in the future in order to ensure quality and safety of water sources such as lakes and rivers.

The advanced treatment technique is classified into physicochemical treatment, biological treatment, and complex treatment using both physicochemical treatment and biological treatment. The physicochemical treatment uses coagulative precipitation, separation, adsorption, ion exchange, oxidation or the like, and the biological treatment representatively uses aerobic treatment, anaerobic treatment, a combination of aerobic treatment and anaerobic treatment or the like. The complex treatment is a water treatment technique having multiple unit processes such as physicochemical and biological treatment stages.

Biological advanced processes basically use an active sludge process, but anaerobic, anoxic and aerobic conditions or reaction tanks are suitably combined and used in order to remove nitrogen and phosphorus. In Korea, about fifty modified biological advanced processes have been developed.

An A2/O process, a 5-stage Bardenpho process, a UCT process, a VIP process, a sequencing batch reactor (SBR) or the like are most basically used to remove nitrogen and phosphorus. Recently, a process using a membrane bio reactor (MBR) has been proposed, and the MBR process solves problems of existing biological treatment such as sludge bulking since the MBR process requires a small installation area, allows easy automatic operation and does not demand operating a separate precipitation tank. In addition, the quality and amount of water to be treated may be adjusted according to material of the membrane and surface characteristics such as pores, and a RO membrane may be further used at the rear end selectively to perfectly remove a trace of harmful antibiotic or medicinal substances. For this reason, the MBR process is frequently used as a reutilization process. The demand for the advance treatment of sewage and waste water using the MBR is rapidly increasing along with the water reutilization policy, and a system combined with a biological nitrogen and phosphorus removing process is being developed.

Recently, the Minister of Environment in Korea has integrated an existing Wastewater and Excreta Act into a Sewage Act System, and the revised and proclaimed Sewage Act was enforced on September, 2007. Main changes of the newly enforced Sewage Act include reinforced water quality criteria on water discharge and obligations about reutilization of treated water to the public sewage treatment facility to promote the use of water recycling. According to this Act, for wastewater treatment facilities having a daily treatment capacity of 50 $m^3$ or above, the criteria on the quality of discharge water is reinforced to the same level as the public sewage treatment facilities to obey 10 mg/L or less of BOD and SS, 20 mg/L or less of entire nitrogen, 2 mg/L or less of entire phosphorus, 3,000 or less per mL of colon bacillus. The revised Act is applied to existing facilities from Jan. 1, 2012. Therefore, it is expected that the market for advanced biological treatment methods combined with the MBR system, which are suitable for small-sized sewage treatment facilities, will rapidly increase.

Korean Patent Registration No. 275563 discloses a wastewater treatment apparatus having an anaerobic tank and two intermittent aeration tanks, and an aerobic condition and an anoxic condition are alternately applied in two intermittent aeration tanks to remove nitrogen and phosphorus. However, even though Korean Patent Registration No. 275563 is applied, it is difficult to meet the gradually reinforced water quality criteria. In addition, when reutilizing treated water, a filtering process should be added, or a membrane or a separate membrane separating tank is additionally required in the intermittent aeration tank.

SUMMARY

The present disclosure is directed to providing an apparatus and method for alternative aeration-effluent wastewater treatment, which allows the biological treatment to be performed sufficiently in an intermittent aeration tank by combining an anaerobic tank with a plurality of intermittent aeration tanks and selectively changing an inflow path of influent water according to an operation status of the intermittent aeration tanks.

The present disclosure is also directed to providing an apparatus and method for alternative aeration-effluent wastewater treatment, which allows the aeration and treated water to continuously discharge through two intermittent aeration tanks by independently forming an air injection line and a treated water discharge line at a ceramic membrane provided in each intermittent aeration tank.

In one aspect, the present disclosure provides an apparatus for alternative aeration-effluent wastewater treatment using a ceramic membrane, which includes: an anaerobic tank for discharging phosphorus (P) contained in influent water and denitrifying nitrite nitrogen and nitrate nitrogen; a first intermittent aeration tank and a second intermittent aeration tank alternately operating under an aerobic condition and an anoxic condition to, under the aerobic condition, convert organic nitrogen and ammoniac nitrogen into nitrite and nitrate nitrogen and allow phosphorus in the influent water to be taken by phosphorus-storing bacteria and to, under the anoxic condition, reduce nitrite and nitrate nitrogen into nitrogen gas; and a first ceramic membrane and a second ceramic membrane respectively provided at the lower portion of the first intermittent aeration tank and the second intermittent aeration tank to produce treated water, wherein the first intermittent aeration tank and the second intermittent aeration tank operate under different conditions, and the influent water discharging from the anaerobic tank is supplied to an intermittent aeration tank operating under the aerobic condition among the first intermittent aeration tank and the second intermittent aeration tank, and wherein, in a case where the first intermittent aeration tank is under the aerobic condition and the second intermittent aeration tank is under the anoxic condition, air is injected through the first ceramic membrane into the first intermittent aeration tank so that the first intermittent aeration tank forms an aerobic status, and treated water discharges out through the second ceramic membrane.

The first ceramic membrane and the second ceramic membrane may be respectively provided with an air injection line and a treated water discharge line, the air injection line may inject air into the first ceramic membrane or second ceramic membrane, and the treated water discharge line may discharge treated water, produced by the first ceramic membrane or the second ceramic membrane, to the outside.

In a case where the first intermittent aeration tank or the second intermittent aeration tank is under the aerobic condition, air may be injected through the air injection line into the first ceramic membrane or the second ceramic membrane and simultaneously the treated water discharge line may be blocked, and, in a case where the first intermittent aeration tank or the second intermittent aeration tank is under the anoxic condition, air injection through the air injection line may be blocked and simultaneously treated water produced by the first ceramic membrane or the second ceramic membrane may discharge to the outside.

In a case where the first intermittent aeration tank is under the aerobic condition and the second intermittent aeration tank is under the anoxic condition, the influent water in the anaerobic tank may be supplied to the first intermittent aeration tank, stay in the first intermittent aeration tank and then be supplied to the second intermittent aeration tank, and, in a case where the first intermittent aeration tank is under the anoxic condition and the second intermittent aeration tank is under the aerobic condition, the influent water in the anaerobic tank may be supplied to the second intermittent aeration tank, stay in the second intermittent aeration tank and then be supplied to the first intermittent aeration tank.

The process where the influent water in the anaerobic tank moves to and stays in the first (or second) intermittent aeration tank and the process where the influent water moves from the first (or second) intermittent aeration tank to the second (or first) intermittent aeration tank and stays in the second (or first) intermittent aeration tank may be performed within a period when the first (or second) intermittent aeration tank operates under the aerobic condition (or the anoxic condition).

In another aspect, the present disclosure also provides a method for alternative aeration-effluent wastewater treatment using a ceramic membrane, which uses a wastewater treatment apparatus where an anaerobic tank, a first intermittent aeration tank and a second intermittent aeration tank are successively arranged and the first intermittent aeration tank and the second intermittent aeration tank are respectively provided with a first ceramic membrane and a second ceramic membrane, wherein the first intermittent aeration tank and the second intermittent aeration tank operate under different conditions, and the influent water discharging from the anaerobic tank is supplied to an intermittent aeration tank operating under the aerobic condition among the first intermittent aeration tank and the second intermittent aeration tank, and wherein, in a case where the first intermittent aeration tank is under the aerobic condition and the second intermittent aeration tank is under the anoxic condition, air is injected through the first ceramic membrane into the first intermittent aeration tank so that the first intermittent aeration tank forms an aerobic status, and treated water discharges out through the second ceramic membrane.

The sludge in the second intermittent aeration tank may be carried to the anaerobic tank, and the anaerobic tank may receive sewage and waste water as well as the sludge in the second intermittent aeration tank by means of influent water and discharge phosphorus (P) contained in the corresponding influent water, and simultaneously may denitrify nitrite nitrogen and nitrate nitrogen and supply the denitrified nitrite nitrogen and nitrate nitrogen to the first intermittent aeration tank or the second intermittent aeration tank.

The apparatus and method for alternative aeration-effluent wastewater treatment using a ceramic membrane according to the present disclosure gives the following effects.

Since a first intermittent aeration tank and a second intermittent aeration tank are successively arranged at the rear end of an anaerobic tank and since the influent water in the anaerobic tank is supplied to the intermittent aeration tank which is operating under an aerobic condition and passes through the intermittent aeration tank under an aerobic condition and the intermittent aeration tank under an anoxic condition simultaneously for a predetermined period, the efficiency of removing nitrogen and phosphorus may be improved.

In addition, since a ceramic membrane is provided at each intermittent aeration tank and the treated water selectively discharges according to an aerobic-anoxic condition, the treated water may be continuously produced for 24 hours a day.

When applying the control of an inflow path of influent water according to an operating condition and the selective discharge of treated water by the ceramic membrane, an additional reaction tank is not demanded in comparison to a conventional advanced treatment apparatus, and so reduction of installation costs and sites will be expected.

In addition, since the ceramic membrane plays a kind of air diffuser and the aeration and washing processes may be implemented together by injecting high-pressure air, a conventional back-flushing process may be not used, and the air injecting configuration may be simplified.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 1 is a diagram showing an apparatus for alternative aeration-effluent wastewater treatment using a ceramic membrane according to an embodiment of the present disclosure.

[Detailed Description of Main Elements]

| | |
|---|---|
| 110: anaerobic tank | 120: first intermittent aeration tank |
| 121: first ceramic membrane | 130: second intermittent aeration tank |

-continued

[Detailed Description of Main Elements]

| 131: second ceramic membrane | 141: air injection line |
| 142: treated water discharge line | |

DETAILED DESCRIPTION

In the present disclosure, an anaerobic tank, a first intermittent aeration tank and a second intermittent aeration tank are successively arranged. The first intermittent aeration tank and the second intermittent aeration tank respectively operate alternately under an aerobic condition and anoxic condition. The first intermittent aeration tank and the second intermittent aeration tank always operate under different conditions. In a case where the first intermittent aeration tank is under the aerobic condition, influent water flows in through the anaerobic tank the first intermittent aeration tank and the second intermittent aeration tank successively. In a case where the second intermittent aeration tank is under the aerobic condition, influent water flows in through the anaerobic tank, the second intermittent aeration tank and the first intermittent aeration tank successively. In this way, the corresponding influent water may experience both aerobic condition and anoxic condition, and the efficiency of removing nitrogen and phosphorus may be maximized.

In addition, the first intermittent aeration tank and the second intermittent aeration tank are respectively provided with a ceramic membrane for the treatment of influent water, and each ceramic membrane has an air injection line and a treated water discharge line, so that one of the first intermittent aeration tank and the second intermittent aeration tank performs an aeration process and the other performs a treated water discharging process. In this way, the treated water may continuously discharge.

Along with it, since a ceramic membrane having a lot of pores is applied, a separate air diffuser is not demanded when supplying air, and by supplying high-pressure air to the membrane, it is possible to obtain an aeration effect and a membrane washing effect simultaneously.

Hereinafter, the apparatus and method for alternative aeration-effluent wastewater treatment using a ceramic membrane according to an embodiment of the present disclosure will be described in detail with respect to the accompanying drawing.

Referring to FIG. 1, an apparatus for alternative aeration-effluent wastewater treatment using a ceramic membrane according to an embodiment of the present disclosure includes an anaerobic tank 110, a first intermittent aeration tank 120 and a second intermittent aeration tank 130. In addition, the first intermittent aeration tank 120 includes a first ceramic membrane 121, and the second intermittent aeration tank 130 includes a second ceramic membrane 131.

The anaerobic tank 110 plays a role of discharging phosphorus (P) contained in influent water and denitrifying nitrite nitrogen and nitrate nitrogen. The influent water flowing into the anaerobic tank 110 includes sewage and waste water introduced from the outside and return sludge carried from the second intermittent aeration tank 130. A stirrer is provided in the anaerobic tank 110, an anaerobic condition may be obtained by adjusting a dissolved oxygen concentration and an oxidation-reduction potential difference only by stirring. The anaerobic tank 110 may operate for 1 to 2 hours.

The first intermittent aeration tank 120 and the second intermittent aeration tank 130 respectively operate under an aerobic condition and an anoxic condition alternately. Under the aerobic condition, the first intermittent aeration tank 120 plays a role of converting organic nitrogen and ammoniac nitrogen into nitrite and nitrate nitrogen and allowing phosphorus in the influent water to be taken by means of phosphorus-storing bacteria. Under the anoxic condition, the first intermittent aeration tank 120 plays a role of reducing nitrite and nitrate nitrogen into nitrogen gas.

The first intermittent aeration tank 120 and the second intermittent aeration tank 130 operate in opposite statuses. If the first intermittent aeration tank 120 operates under the aerobic condition, the second intermittent aeration tank 130 operates under the anoxic condition. On the contrary, if the first intermittent aeration tank 120 operates under the anoxic condition, the second intermittent aeration tank 130 operates under the aerobic condition.

The first intermittent aeration tank 120 and the second intermittent aeration tank 130 receive the influent water discharging from the anaerobic tank 110 and play the above function. Depending on the operating status of the first intermittent aeration tank 120 and the second intermittent aeration tank 130, the path for supplying the influent water of the anaerobic tank 110 is changed.

In detail, the influent water in the anaerobic tank 110 is supplied only to an intermittent aeration tank operating under the aerobic condition. For example, if the first intermittent aeration tank 120 is under the aerobic condition and the second intermittent aeration tank 130 is under the anoxic condition, the influent water in the anaerobic tank 110 is supplied to the first intermittent aeration tank 120, stays in the first intermittent aeration tank 120 for a predetermined period and then is supplied to the second intermittent aeration tank 130 (see of FIG. 1). In addition, if the first intermittent aeration tank 120 is under the anoxic condition and the second intermittent aeration tank 130 is under the aerobic condition, the influent water in the anaerobic tank 110 is supplied to the second intermittent aeration tank 130, stays in the second intermittent aeration tank 130 for a predetermined period and then is supplied to the first intermittent aeration tank 120 (see of FIG. 1). In other words, if the first intermittent aeration tank 120 is under the aerobic condition, the influent water moves through the anaerobic tank 110, the first intermittent aeration tank 120 and the second intermittent aeration tank 130 successively, and if the second intermittent aeration tank 130 is under the aerobic condition, the influent water moves through the anaerobic tank 110, the second intermittent aeration tank 130 and the first intermittent aeration tank 120 successively.

In a conventional technique where two intermittent aeration tanks are applied, influent water is treated and discharged regardless of an operating status (aerobic or anoxic). Therefore, the intermittent aeration tank may supply influent water even under an anoxic condition, and in this case the aerobic treatment for the influent water will be insufficient.

In the present disclosure, the influent water in the anaerobic tank 110 is supplied only to an intermittent aeration tank under the aerobic condition, and after being treated for a predetermined period under the aerobic condition, the influent water is moved to an intermittent aeration tank under the anoxic condition. Therefore, the influent water introduced from the anaerobic tank 110 may experience both the aerobic condition and the anoxic condition, and so surfeit of phosphorus, nitrification and denitrification oxidation may be performed uniformly.

The process where the influent water in the anaerobic tank 110 moves to and stays in the first (or second) intermittent aeration tank and the process where the influent water moves from the first (or second) intermittent aeration tank to the second (or first) intermittent aeration tank and stays in the second (or first) intermittent aeration tank may be performed within a period when the first (or second) intermittent aeration tank operates under the aerobic condition (or the anoxic condition). The period when the influent water is staying in the first intermittent aeration tank 120 or the second intermittent aeration tank 130 may be selectively adjusted according to the property of the influent water. In an embodiment, the aerobic condition and the anoxic condition may be maintained for 30 minutes to 1 hour, respectively.

As described above, the first ceramic membrane 121 and the second ceramic membrane 131 of a submerged type are provided at the lower portions of the first intermittent aeration tank 120 and the second intermittent aeration tank 130. The first ceramic membrane 121 and the second ceramic membrane 131 respectively play a role of filtering the influent water to produce treated water. According to operating statuses of the first intermittent aeration tank 120 and the second intermittent aeration tank 130, the functions of the first ceramic membrane 121 and the second ceramic membrane 131 are also changed.

In other words, in a case where the first (or second) intermittent aeration tank is under the anoxic condition, the first (or second) ceramic membrane discharges the treated water. However, in a case where the first (or second) intermittent aeration tank is under the aerobic condition, the first (or second) ceramic membrane stops discharging the treated water, and the aeration process is performed by the first (or second) ceramic membrane.

For this, the first ceramic membrane 121 and the second ceramic membrane 131 are respectively provided with an air injection line 141 and a treated water discharge line 142. The air injection line 141 plays a role of injecting air into the first (or second) ceramic membrane to eventually put the first (or second) intermittent aeration tank into the aerobic condition, and the treated water discharge line 142 plays a role of discharging the treated water, produced by the first (or second) ceramic membrane, to the outside.

Accordingly, if the first (or second) intermittent aeration tank is under the aerobic condition, air is injected through the air injection line 141 to the first (or second) ceramic membrane so that the first (or second) intermittent aeration tank comes to an aerobic status, and in this case, the treated water discharge line 142 maintains a locked status. On the contrary, if the first (or second) intermittent aeration tank is under the anoxic condition, air injection by the air injection line 141 is blocked so that the first (or second) intermittent aeration tank comes to an anoxic status, and the treated water, produced by the first (or second) ceramic membrane, discharges out through the treated water discharge line 142. In this configuration, since any one of the first ceramic membrane 121 and the second ceramic membrane 131 discharges the treated water, it is possible to continuously produce treated water for 24 hours a day.

Since the first ceramic membrane 121 and the second ceramic membrane 131 are made of ceramic material such as alumina ($Al_2O_3$) and silica ($SiO_2$) and have pores of 0.01 to 0.45 µm, if high-pressure air is supplied to the first (or second) ceramic membrane through the air injection line 141, the pores formed in the ceramic membrane play a kind of air diffuser, thereby allowing air to be supplied to the intermittent aeration tank. Therefore, a separate air diffuser is not demanded for air injection. In addition, since high-pressure air is injected into the first (or second) ceramic membrane, the effect of washing the first (or second) ceramic membrane may be obtained together with the aeration effect. In a conventional case, back-flushing water (treated water) is used to wash the membrane, which deteriorates the treated water production efficiency. However, in the present disclosure, this problem is solved.

Next, treatment characteristics of the apparatus for alternative aeration-effluent wastewater treatment using a ceramic membrane according to an embodiment of the present disclosure will be described. Table 1 below shows water quality characteristics of the treated water obtained by the apparatus for alternative aeration-effluent wastewater treatment using a ceramic membrane according to an embodiment of the present disclosure. In Table 1, the criterion value represents a treated water discharge criterion of a wastewater and excreta discharge region (special countermeasure area).

TABLE 1

|  | BOD (mg/L) | SS (mg/L) | COD (mg/L) | T-N (mg/L) | T-P (mg/L) |
| --- | --- | --- | --- | --- | --- |
| Criterion value | <10 | <10 | <40 | <20 | <2 |
| Present disclosure | <3 | <3 | <5 | <5 | <0.5 |

Referring to Table 1, it could be understood that the treated water obtained according to the present disclosure meets all criteria of biological oxygen demand (BOD), solid state (SS), chemical oxygen demand (COD), total nitrogen (T-N), and total phosphorus (T-P).

While the exemplary embodiments have been shown and described, it will be understood by those skilled in the art that various changes in form and details may be made thereto without departing from the spirit and scope of the present disclosure as defined by the appended claims.

What is claimed is:

1. An apparatus for alternative aeration-effluent wastewater treatment using a ceramic membrane, comprising:
   an anaerobic tank for discharging phosphorus (P) contained in influent water and denitrifying nitrite nitrogen and nitrate nitrogen;
   a first intermittent aeration tank and a second intermittent aeration tank alternately operating under an aerobic condition and an anoxic condition to, under the aerobic condition, convert organic nitrogen and ammoniac nitrogen into nitrite and nitrate nitrogen and allow phosphorus in the influent water to be taken by phosphorus-storing bacteria and to, under the anoxic condition, reduce nitrite and nitrate nitrogen into nitrogen gas; and
   a first ceramic membrane and a second ceramic membrane respectively provided at the lower portion of the first intermittent aeration tank and the second intermittent aeration tank to produce treated water,
   wherein the first intermittent aeration tank and the second intermittent aeration tank operate under different conditions, and the influent water discharging from the anaerobic tank is supplied to an intermittent aeration tank operating under the aerobic condition among the first intermittent aeration tank and the second intermittent aeration tank,
   wherein, in a case where the first intermittent aeration tank is under the aerobic condition and the second intermittent aeration tank is under the anoxic condition, air is injected through the first ceramic membrane into the first intermittent aeration tank so that the first intermittent aeration tank forms an aerobic status, and treated water discharges out through the second ceramic membrane,
   wherein, in a case where the first intermittent aeration tank is under the aerobic condition and the second intermittent aeration tank is under the anoxic condition, the influent water in the anaerobic tank is supplied to the first intermittent aeration tank, stays in the first intermittent aeration tank and then is supplied to the second intermittent aeration tank, and wherein, in a case where the first intermittent aeration tank is under the anoxic condition and the second intermittent aeration tank is under the aerobic condition, the influent water in the anaerobic tank is supplied to the second intermittent aeration tank, stays in the second intermittent aeration tank and then is supplied to the first intermittent aeration tank.

2. The apparatus for alternative aeration-effluent wastewater treatment using a ceramic membrane according to claim 1, wherein the first ceramic membrane and the second ceramic membrane are respectively provided with an air injection line and a treated water discharge line, and wherein the air injection line injects air into the first ceramic membrane or second ceramic membrane, and the treated water discharge line discharges treated water, produced by the first ceramic membrane or the second ceramic membrane, to the outside.

3. The apparatus for alternative aeration-effluent wastewater treatment using a ceramic membrane according to claim 2, wherein, in a case where the first intermittent aeration tank or the second intermittent aeration tank is under the aerobic condition, air is injected through the air injection line into the first ceramic membrane or the second ceramic membrane and simultaneously the treated water discharge line is blocked, and wherein, in a case where the first intermittent aeration tank or the second intermittent aeration tank is under the anoxic condition, air injection through the air injection line is blocked and simultaneously treated water produced by the first ceramic membrane or the second ceramic membrane discharges to the outside.

4. The apparatus for alternative aeration-effluent wastewater treatment using a ceramic membrane according to claim 1, wherein the process where the influent water in the anaerobic tank moves to and stays in the first (or second) intermittent aeration tank and the process where the influent water moves from the first (or second) intermittent aeration tank to the second (or first) intermittent aeration tank and stays in the second (or first) intermittent aeration tank are performed within a period when the first (or second) intermittent aeration tank operates under the aerobic condition (or the anoxic condition).

5. A method for alternative aeration-effluent wastewater treatment using a ceramic membrane, which uses a wastewater treatment apparatus where an anaerobic tank, a first intermittent aeration tank and a second intermittent aeration tank are successively arranged and the first intermittent aeration tank and the second intermittent aeration tank are respectively provided with a first ceramic membrane and a second ceramic membrane, wherein the first intermittent aeration tank and the second intermittent aeration tank operate under different conditions, and the influent water discharging from the anaerobic tank is supplied to an intermittent aeration tank operating under the aerobic condition among the first intermittent aeration tank and the second intermittent aeration tank, wherein, in a case where the first intermittent aeration tank is under the aerobic condition and the second intermittent aeration tank is under the anoxic condition, air is injected through the first ceramic membrane into the first intermittent aeration tank so that the first intermittent aeration tank forms an aerobic status, and treated water discharges out through the second ceramic membrane, wherein, in a case where the first intermittent aeration tank is under the aerobic condition and the second intermittent aeration tank is under the anoxic condition, the influent water in the anaerobic tank is supplied to the first intermittent aeration tank, stays in the first intermittent aeration tank and then is supplied to the second intermittent aeration tank, and wherein, in a case where the first intermittent aeration tank is under the anoxic condition and the second intermittent aeration tank is under the aerobic condition, the influent water in the anaerobic tank is supplied to the second intermittent aeration tank, stays in the second intermittent aeration tank and then is supplied to the first intermittent aeration tank.

6. The method for alternative aeration-effluent wastewater treatment using a ceramic membrane according to claim 5, wherein the first ceramic membrane and the second ceramic membrane are respectively provided with an air injection line and a treated water discharge line, and wherein the air injection line injects air into the first ceramic membrane or second ceramic membrane, and the treated water discharge line discharges treated water, produced by the first ceramic membrane or the second ceramic membrane, to the outside.

7. The method for alternative aeration-effluent wastewater treatment using a ceramic membrane according to claim 6, wherein, in a case where the first intermittent aeration tank or the second intermittent aeration tank is under the aerobic condition, air is injected through the air injection line into the first ceramic membrane or the second ceramic membrane and simultaneously the treated water discharge line is blocked so that the first ceramic membrane or the second ceramic membrane is washed by the injected air, and wherein, in a case where the first intermittent aeration tank or the second intermittent aeration tank is under the anoxic condition, air injection through the air injection line is blocked and simultaneously treated water produced by the first ceramic membrane or the second ceramic membrane discharges to the outside.

8. The method for alternative aeration-effluent wastewater treatment using a ceramic membrane according to claim 5, wherein the process where the influent water in the anaerobic tank moves to and stays in the first (or second) intermittent aeration tank and the process where the influent water moves from the first (or second) intermittent aeration tank to the second (or first) intermittent aeration tank and stays in the second (or first) intermittent aeration tank are performed within a period when the first (or second) intermittent aeration tank operates under the aerobic condition (or the anoxic condition).

9. The method for alternative aeration-effluent wastewater treatment using a ceramic membrane according to claim 5, wherein sludge in the second intermittent aeration tank is carried to the anaerobic tank, and wherein the anaerobic tank receives sewage and waste water as well as the sludge in the second intermittent aeration tank by means of influent water and discharges phosphorus (P) contained in the corresponding influent water, and simultaneously denitrifies nitrite nitrogen and nitrate nitrogen and supplies the denitrified nitrite nitrogen and nitrate nitrogen to the first intermittent aeration tank or the second intermittent aeration tank.

* * * * *